US010440177B1

(12) United States Patent
Vincent et al.

(10) Patent No.: US 10,440,177 B1
(45) Date of Patent: *Oct. 8, 2019

(54) VIRTUAL TELEPHONE EXTENSION

(71) Applicant: 8x8, Inc., San Jose, CA (US)

(72) Inventors: Jean Vincent, Marrakesh (MA); Tony Chan, Santa Clara, CA (US); Jean-Francois Catz, Aix En Provence (FR)

(73) Assignee: 8x8, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,652

(22) Filed: Mar. 20, 2018

Related U.S. Application Data

(60) Continuation of application No. 15/499,161, filed on Apr. 27, 2017, now Pat. No. 9,924,030, which is a
(Continued)

(51) Int. Cl.
*H04M 3/42* (2006.01)
*H04M 7/00* (2006.01)

(52) U.S. Cl.
CPC ..... *H04M 3/42272* (2013.01); *H04M 3/4234* (2013.01); *H04M 3/42161* (2013.01);
(Continued)

(58) Field of Classification Search
CPC ........................ H04M 7/0006; H04M 3/42323
(Continued)

(56) References Cited

U.S. PATENT DOCUMENTS

| 4,754,479 A | 6/1988 | Bicknell et al. |
| 5,073,890 A | 12/1991 | Danielsen |

(Continued)

FOREIGN PATENT DOCUMENTS

| JP | 2001-237965 A | 8/2001 |
| WO | 01/50682 A1 | 7/2001 |

OTHER PUBLICATIONS

Micro Telco Gateway Phone Center, Quicknet Technologies, Inc., www.quicknet.net/products/mtg_phonecenter (May 28, 2003), 2 pgs.
(Continued)

*Primary Examiner* — Quynh H Nguyen
(74) *Attorney, Agent, or Firm* — Crawford Maunu PLLC

(57) ABSTRACT

The present disclosure is directed to a method and system for routing communications. A plurality of communications-enabled devices are coupled to a communications network. Each communications-enabled device has a device identifier. A user-programmable database associates each of a plurality of user identifiers with a device identifier. A router circuit is coupled to the communications network through a portal communication device having a portal identifier. A user designates a destination user identifier when making a communication. The router circuit switches the call, directing the call to a destination device identifier responsive to the user-programmable database association between the destination user identifier and a device identifier. According to certain aspects, communications are directed to users and are routed to associated equipment, a user identifier serving as a virtual extension number. Users remotely program the database to direct their communications to communications-enabled devices at various destinations.

20 Claims, 1 Drawing Sheet

Related U.S. Application Data continuation of application No. 14/697,096, filed on Apr. 27, 2015, now Pat. No. 9,641,689, which is a division of application No. 12/729,869, filed on Mar. 23, 2010, now Pat. No. 9,055,423, which is a continuation of application No. 11/741,379, filed on Apr. 27, 2007, now Pat. No. 7,684,554, which is a continuation of application No. 10/326,572, filed on Dec. 20, 2002, now Pat. No. 7,218,721.

(60) Provisional application No. 60/345,258, filed on Jan. 2, 2002.

(52) U.S. Cl.
CPC ..... *H04M 3/42323* (2013.01); *H04M 7/0069* (2013.01); *H04M 7/0075* (2013.01); *H04M 2203/558* (2013.01); *H04M 2203/6018* (2013.01)

(58) Field of Classification Search
USPC .................. 379/211.02; 370/352, 389, 392
See application file for complete search history.

(56) References Cited

U.S. PATENT DOCUMENTS

| | | | |
|---|---|---|---|
| 5,311,570 A | 5/1994 | Grimes et al. |
| 5,317,621 A | 5/1994 | Shibayama |
| 5,598,464 A | 1/1997 | Hess et al. |
| 5,644,404 A | 7/1997 | Hashimoto et al. |
| 5,689,555 A | 11/1997 | Sonnenberg |
| 5,703,941 A | 12/1997 | Nakajima et al. |
| 5,805,587 A | 9/1998 | Norris et al. |
| 5,832,061 A | 11/1998 | Rubin |
| 5,933,785 A | 8/1999 | Tayloe |
| 5,946,618 A | 8/1999 | Agre et al. |
| 5,978,450 A | 11/1999 | McAllister et al. |
| 6,011,844 A | 1/2000 | Uppaluru et al. |
| 6,067,347 A | 5/2000 | Farris et al. |
| 6,173,041 B1 | 1/2001 | Borland et al. |
| 6,185,288 B1 | 2/2001 | Wong |
| 6,215,783 B1 | 4/2001 | Neyman |
| 6,236,851 B1 | 5/2001 | Fougnies et al. |
| 6,324,402 B1 | 11/2001 | Waugh et al. |
| 6,351,762 B1 | 2/2002 | Ludwig et al. |
| 6,363,411 B1 | 3/2002 | Dugan et al. |
| 6,445,775 B1 | 9/2002 | Morganstein et al. |
| 6,463,051 B1 | 10/2002 | Ford |
| 6,542,475 B1 | 4/2003 | Bala et al. |
| 6,567,514 B2 | 5/2003 | Fleischer, III et al. |
| 6,574,216 B1 | 6/2003 | Farris et al. |
| 6,574,335 B1 | 6/2003 | Kalmanek, Jr. et al. |
| 6,628,760 B2 | 9/2003 | Mirashrafi et al. |
| 6,671,523 B1 | 12/2003 | Niepel et al. |
| 6,683,870 B1 | 1/2004 | Archer |
| 6,707,811 B2 | 3/2004 | Greenberg et al. |
| 6,711,241 B1 | 3/2004 | White et al. |
| 6,731,625 B1 | 5/2004 | Eastep et al. |
| 6,731,630 B1 | 5/2004 | Schuster et al. |
| 6,747,970 B1 | 6/2004 | Lamb et al. |
| 6,760,324 B1 | 7/2004 | Scott et al. |
| 6,775,267 B1 | 8/2004 | Kung et al. |
| 6,850,758 B1 | 2/2005 | Paul et al. |
| 6,870,835 B1 | 3/2005 | Chen et al. |
| 6,985,478 B2 | 1/2006 | Pogossiants et al. |
| 6,996,603 B1 | 2/2006 | Srinivasan |
| 7,072,354 B1 | 7/2006 | Beathard |
| 7,082,300 B1 | 7/2006 | Link, II et al. |
| 7,218,721 B1 | 5/2007 | Vincent et al. |
| 7,245,912 B1 | 7/2007 | Fenton et al. |
| 7,349,700 B1 | 3/2008 | Goldfinger |
| 7,383,535 B1 | 6/2008 | Kshetrapal et al. |
| 7,551,913 B1 | 6/2009 | Chien |
| 7,555,110 B2 | 6/2009 | Dolan et al. |
| 7,684,554 B1 | 3/2010 | Vincent et al. |
| 8,027,332 B1 | 9/2011 | Martin et al. |
| 8,948,358 B1 | 2/2015 | Rengarajan et al. |
| 9,641,689 B1 | 5/2017 | Vincent et al. |
| 2002/0009073 A1 | 1/2002 | Furukawa et al. |
| 2002/0019246 A1 | 2/2002 | Forte |
| 2002/0049745 A1 | 4/2002 | Yuichiro et al. |
| 2002/0085701 A1 | 7/2002 | Parsons et al. |
| 2002/0098855 A1 | 7/2002 | Hartmaier et al. |
| 2002/0112021 A1 | 8/2002 | Detlef |
| 2002/0114326 A1 | 8/2002 | Mahalingaiah |
| 2002/0114329 A1 | 8/2002 | Galvin et al. |
| 2002/0128857 A1 | 9/2002 | Lee |
| 2002/0146103 A1 | 10/2002 | Holt et al. |
| 2002/0146104 A1 | 10/2002 | McIntyre |
| 2002/0162008 A1 | 10/2002 | Hill |
| 2002/0174141 A1 | 11/2002 | Chen |
| 2002/0197991 A1 | 12/2002 | Anvekar et al. |
| 2003/0009593 A1 | 1/2003 | Apte |
| 2003/0018702 A1 | 1/2003 | Broughton et al. |
| 2003/0023714 A1 | 1/2003 | Ziegler et al. |
| 2003/0043974 A1 | 3/2003 | Emerson |
| 2003/0056092 A1 | 3/2003 | Edgett et al. |
| 2003/0059039 A1 | 3/2003 | Meyerson et al. |
| 2003/0072431 A1 | 4/2003 | Lamy et al. |
| 2003/0165227 A1 | 9/2003 | De Beer |
| 2005/0091327 A1 | 4/2005 | Koch |
| 2006/0077956 A1 | 4/2006 | Saksena et al. |
| 2006/0142012 A1 | 6/2006 | Kirchhoff et al. |
| 2008/0031228 A1 | 2/2008 | Gallant |

OTHER PUBLICATIONS

Internet LineJACK , Quicknet Technologies, Inc., www.quicknet.net/products/ilj (May 28, 2003), 2 pgs.

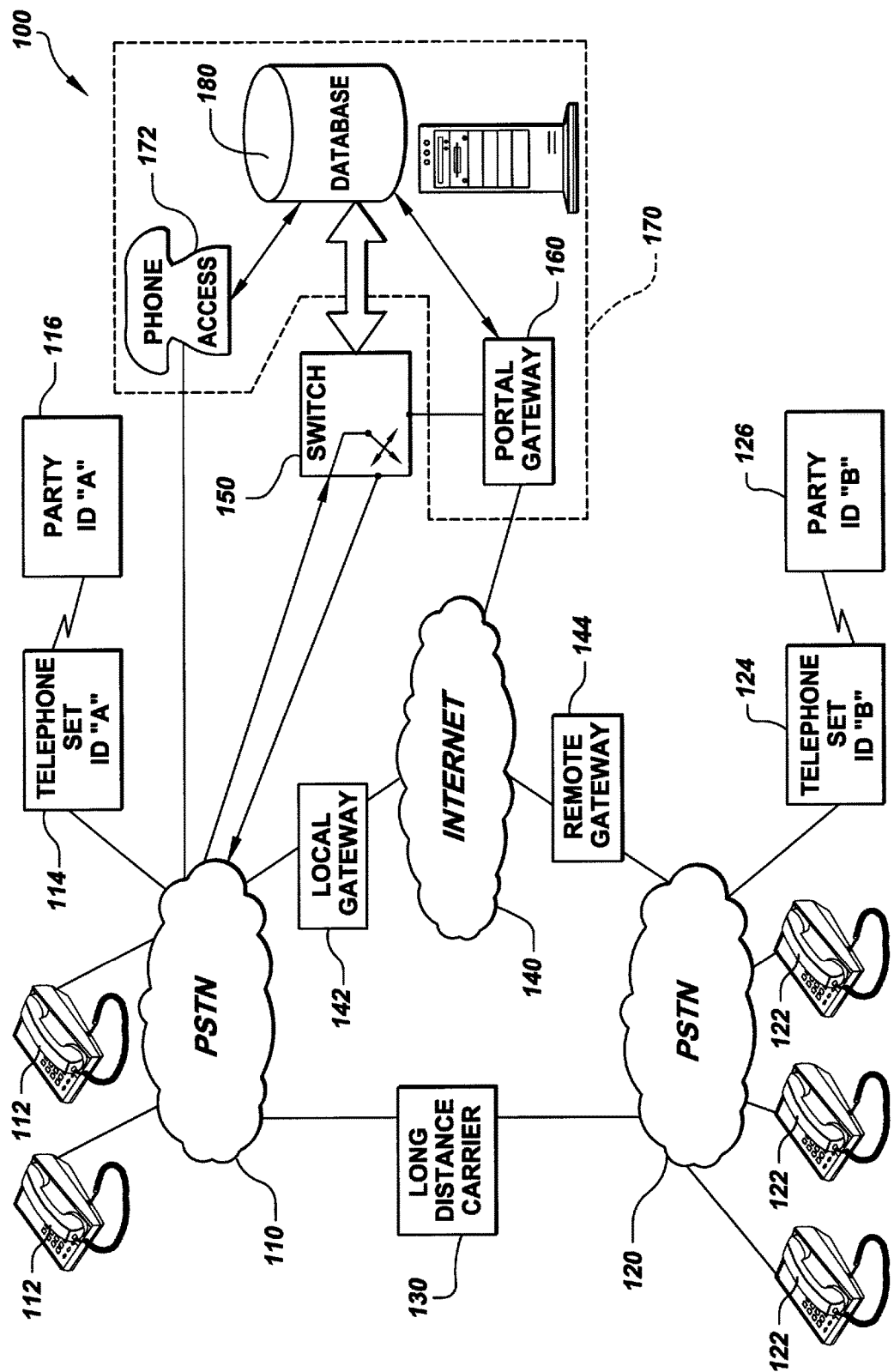

VIRTUAL TELEPHONE EXTENSION

RELATED PATENT DOCUMENTS

This patent document is related to, as a continuation or otherwise, to the following patent documents: U.S. patent application Ser. No. 15/499,161 filed on Apr. 27, 2017 (U.S. Pat. No. 9,924,030), U.S. patent application Ser. No. 14/697,096 filed on Apr. 27, 2015 (U.S. Pat. No. 9,641,689); U.S. patent application Ser. No. 12/729,869 filed on Mar. 23, 2010 (U.S. Pat. No. 9,055,423); U.S. patent application Ser. No. 11/741,379 filed on Apr. 27, 2007 (U.S. Pat. No. 7,684,554); U.S. patent application Ser. No. 10/326,572 filed on Dec. 20, 2002 (U.S. Pat. No. 7,218,721); U.S. Provisional Patent Application Ser. No. 60/345,258, filed on Jan. 2, 2002; and U.S. patent application Ser. No. 09/966,713 filed on Sep. 28, 2001 (U.S. Pat. No. 7,394,803), each of which is fully incorporated by reference.

FIELD OF THE INVENTION

The present invention generally relates to communication systems and, more particularly, to a method for routing communications optionally using a broadband telephony system having distributed gateways.

BACKGROUND OF THE INVENTION

The communications industry continues to rely upon advances in technology to realize higher-functioning systems at cost-effective prices. Telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few. Widespread acceptance and usage of communication systems and services are largely a function of cost and user convenience.

ITSPs, and increasingly private companies, are deploying Voice-over-Internet Protocol (VoIP) technologies through a broadband data network for their private branch exchange (PBX) and communications needs. "Hop-off" gateways bridge local PSTNs and the broadband data network, for example, the Internet. User's calls are routed from a local telephone system, through a local gateway in order to jump from one side of the broadband data network to another where a remote gateway bridges the call to a remote telephone system. Typically, VoIP services are "invisible" to users, operating as any conventional long-distance carrier and exploiting the "free" long-distance transmission of data once on the broadband data network.

The scalability of a communications system weighs heavily upon the acceptance of the system. As the face of today's mobile society and workplace is changing, the ability to provide flexible communications services is becoming increasingly important. Many people are highly mobile on a daily basis, traveling for business, working from several locations, such as base office, branch office, home and field locations. A variety of tools and methods are conventionally used to coordinate telephone communications. Continuously updating a secretary or voice mail greeting with a user's current whereabouts and a nearby telephone number is typical. Callers trying to reach the user at the user's published telephone number are provided the user's updated location information and required to make a second call to track down the party they are attempting to reach. Alternately, pagers alert a user that a caller is attempting to reach the user, providing a contact telephone number for the user to initiate a return call in order to establish a connection. Cellular telephones provide mobile telephone service that follows a user, but pager and cell phone services are expensive and rely on sufficiently-charged batteries to power the mobile equipment. Mobile area coverage is uncertain and call quality is typically lower than for hard-wired communication systems.

To accommodate ongoing communications needs, a user-friendly and user-reconfigurable system would be advantageous. Accordingly, there is a need for a flexible and cost-effective approach for providing seamless telephony services to a plurality of user-reconfigurable destinations, including fixed and mobile user interfaces. Such an approach should take into consideration end-users' expectations of accessing any other telephone in the world using existing telephone equipment, user interfaces and user calling paradigms. A broadband data network telephony system and method that address the aforementioned problems, as well as other related problems, are therefore desirable.

SUMMARY OF THE INVENTION

The present invention is directed to a communication routing system utilizing a broadband data network. The present invention is exemplified in a number of implementations and applications, some of which are summarized below.

According to an example embodiment of the present invention, a communication routing system includes a plurality of communication devices communicatively coupled to a communication network, a user-programmable database and a call-routing switch arrangement. Each communication device has a device identifier. The user-programmable database associates each of a plurality of user identifiers with a device identifier. The call-routing switch arrangement is also coupled to the communication network through a portal communication device, and is adapted to route calls designating a destination user identifier to a communication device associated with the designated destinations user identifier responsive to the user-programmable database.

According to other aspects of the present invention, the call-routing switch is further adapted to optionally route non-local calls through a broadband data network. When more than one user is associated with a destination communication device, the call-routing switch is adapted to authenticate the designated user identifier prior to call delivery. The portal communication device has a portal identifier included as a prefix of each user identifier in a further aspect of the present invention. Optionally, the portal communications device prompts callers from a user directory, and is adapted to elicit a destination user identifier determined from a pre-defined directory, and designates the destination user identifier prior to passing a call through to the call-routing switch. Voice mail and transcribed e-mail functions are optionally included in the call-routing system of the present invention.

In another example embodiment of the present invention, a method is provided for operating a communication routing system utilizing a broadband data network to provide telephony services, including programmed and default call routing to a user's virtual extension, voice mail, or e-mail resources.

The above summary of the present invention is not intended to describe each illustrated embodiment or every implementation of the present invention. The figures and detailed description that follow more particularly exemplify these embodiments.

BRIEF DESCRIPTION OF THE DRAWING

The invention may be more completely understood in consideration of the following detailed description of various embodiments of the invention in connection with the accompanying drawings, in which:

FIG. 1 is a communication routing system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communication systems, including telephony systems, and has been found particularly suited to broadband data network telephony systems, including systems which route the communications via an Internet protocol (IP) network. While the present invention is not necessarily limited to such telephony systems, various aspects of the invention may be appreciated through a discussion of various examples using this context.

Conventionally, a telephony system caller desiring to call "someone" actually designates to the telephony system, by dialing a telephone number, an identifier for a telephony system circuit or channel. Typically, one or more communication devices are hard-wired to the telephony system or channel. Where more than one communication device is connected to a particular circuit, the communication devices operate together in parallel. Conventionally, communication equipment, rather than people, is identified when placing a call. Association between a person and a communication device is accomplished via published correlation lists, for example telephone books or web-based lists. A caller must learn of the association between the person the caller wishes to call and the appropriate communication device, subsequently designating the associated communication device identifier to a communication network call-routing switch.

The communications routing system of the present invention is adapted to receive, route, process, and deliver communications data, particularly telephony communications signals, using a cost-effective, user-friendly operations platform. The system includes a call-routing switch, a user-programmable database and a plurality of communication devices communicatively coupled to one or more communication channels comprising a communication network. Each user programs the database with an association between that user's identifier and a communication device at which the user wishes to receive calls. A caller then designates a user identifier rather than a communication device identifier, to a communication call-routing switch and the switch routes the call to the communication device the called party has pre-associated in a database with the called party's user identifier and at which the called party wishes to receive calls. The user identifier serves as a virtual extension number assigned to an individual person, entity, business or organization. User identifiers may still identify geographic locations where appropriate, for example, by always associating a user identifier for a geographic location to a communication device identifier at that geographic location.

Users are free to re-program the database association for their user identifier to other communication devices as the user's location changes. For example, when a user moves during the day from office to car to home, the user is able to remotely update the database and associate their user identifier to a communication device near the user's present physical location e.g., first a work telephone, then a car phone, and finally to a communication device located at home. A caller attempting to call the mobile user simply designates the person's user identifier with whom the caller wishes to speak, and the call is routed to a communication device according to a present state of the call-routing database which reflects the user's present location.

Communication network channels are purchased or leased to serve geographic locations, in much the same way that telephone systems operate now. A user pays to have a telephone line serve the user's home, Home A, for example. A telephone book listing publicizes the association between the user and the particular device identifier (telephone number) serving the user's home, Home A. Conventionally, when a user moves from Home A to a new home, Home B, several transactions occur. First, the user stops paying to have a telephone line serve Home A and starts paying to have a telephone line serve Home B. A new party may pay to have a telephone line serve Home A. Publications of the old association between the user and Home A are inaccurate until updated, callers typically receiving an audio message and re-directing their calls manually to a Home B's communication device identifier.

Using the method of the present invention in a situation where a user moves permanently from Home A to Home B, the user's identifier by which the user is called remains unchanged. Publications associating a user with a user identifier remain accurate. The user still stops paying to have a telephone line serve Home A and starts paying to have a telephone line serve Home B. A new party may pay to have a telephone line serve Home A. The user simply updates the database associating their user identifier with a device identifier serving Home B. Subsequent calls to the user (i.e., their user identifier) are properly routed according to the updated database to Home B, thus "finding" the user in their new home location.

Communication network channels with "attached" communication devices include other conventional forms of communication arrangements in addition to a hard-wired, land line having an attached typical telephone set, as in the example above. Communication devices compatible with the present invention include cellular telephones, digital phones, video phones, Voice over Internet Protocol (VoIP) phones, facsimile machines, and other addressable communication channels and receiver implementations.

The call-routing process is invisible to callers. Furthermore, the method of the present invention does not disclose the called party's geographic location to a caller. Business calls to a user reach the called party at their work location, at their home, at the golf course, or even on a long-distance vacation, the actual destination location being invisible to the caller. One aspect of the present invention includes a person having a plurality of user identifiers. For example, a person has one work user identifier and one personal user identifier, in much the same manner that a person might have a work e-mail address and a personal e-mail address. Just as the person might send and receive work-related correspondence through the work e-mail address, and personal correspondence through the personal e-mail address, in one embodiment of the present invention a user receives work-related communications through the work user identifier and receives personal-related communications through the personal user identifier. During working hours, the user can choose to direct calls for the personal user identifier to a voice mail communication device, and further directs calls for the business user identifier to the communication device located in the office where they are working. Alternatively, a user can choose to direct calls for both the business user identifier and the personal user identifier to the communication device located in the office where they are working. One aspect of the present invention is the ability to control the ring pattern of a communication device to indicate the user identifier for which a received call is directed, thus allowing the user to use an appropriate greeting when answering the call. Associations between the two user identifiers can be individually re-directed at the conclusion of working hours, for example.

Another aspect of the present invention is that a user identifier is authenticated by the call-routing switch prior to completing the call whenever a plurality of user identifiers are associated with a singular communication device identifier. In one example embodiment of the present invention, a call to one of a plurality of user identifiers associated with a particular communication device causes the device to indicate the call (e.g., ring the telephone). When answered, a greeting announces that the call is directed for a particular user associated with the user identifier to which the call was placed. An example announcement is, "This is a call for Robert Smith, please enter your password." Alternatively, a display similar to conventional caller ID displays, indicate not only the calling party but also the called party.

An authentication is subsequently solicited before the call is completed, for example, by requesting an authenticating password. The authentication process is similar in part to conventional collect telephone calls. If the correct user has answered the telephone, they can provide the required password and receive the call. If the correct user does not answer the telephone, they can notify the user to which the call is directed, who then authenticates the call. If the called user is not present, or the user does not wish to receive the call, the call can be re-routed to an alternative communication device associated with the user identifier called, such as a voice mail communication device to record a message. The alternative communication device can also be another telephone set. More than one back-up, or alternative, communication device can be associated with a user identifier so that calls progress through a series of device identifiers at which the called party might be located. For example, a call progression might start with a telephone located at work, then no-authentication transfer to a car phone, then no-authentication transfer to a home phone, and finally no-authentication transfer to a voice mail communication device.

In another aspect of the present invention, a call to a user identifier is broadcast to a plurality of associated communication devices simultaneously, the call being completed to the communication device from which a user authentication is accomplished.

In yet another aspect of the present invention, communication devices authenticate a user identifier prior to permitting a call to be made from that communication device. Billing accounting according to user identifiers is possible, as is communication device control. For example, a parent is able to meter or limit the total time a teenager may use the telephone in a given period, and may further restrict use of the communication network to certain hours of the day.

A global emergency user identifier would enable calls to authorities, and in a further example embodiment, not only permits usage of the communication network, but also places and routes the call. For example, dialing 911 would permit usage of a communication device, place a call to authorities as is conventional, inform the authorities of the geographic location of the communication device, and optionally, provide information regarding any users presently associated with the communication device.

In one example embodiment, a user logs-in to a communication device prior to using the communication device to place a call. A caller ID system indicates the name of the particular user to called parties, rather than a label associated with a communication device identifier from which the call was placed, as is now conventional. For example, a conventional caller ID display of a calling party typically indicates the name of the party paying for the communication device and the communication device identifier, "John Smith 123-4567" regardless of who is actually placing a call from that communication device. The method of the present invention enables a caller ID to display a name associated with the user identifier logged-in as making the call, "Mary Smith 987-6543" for example, where 987-6543 is Mary Smith's user identifier, rather than the device identifier from which the call was made. In this way, if the call is not completed, but recorded in a caller ID log, the called party can reach Mary Smith by calling her user identifier even if Mary Smith is no longer associated with the particular communication device from which she initially called.

In a further embodiment, a caller ID log includes not only calling party information, but also the called party information so that the correct party can return Mary Smith's call. In a still further example embodiment, caller ID logs are kept centrally according to user identifiers, a user retrieving their own log information that includes calling party, calling party user identifier and optionally, communication device identifier to which the calling party's call was routed (to which the called party's user identifier was associated at the time of the call).

In another aspect of the present invention, the user-programmable database is remotely programmable. A user reaches the database through a portal communication device having a portal device identifier. The portal communication device is contacted through the communication network, the portal identifier being similar to a communication device identifier. The database and portal communication device are arranged and configured to allow the user to program the database through a communication network communication device. For example, a user calls an access telephone number and is directed through a conventionally-configured telephone menu, selecting and entering database programming choices through the user's communication device. In another example, the user accesses the database through a data network, such as through an Internet web page on a server. The data network couples the user's computer terminal to the database web page server, and information is exchanged over the data network.

Optionally, call-routing databases are geographically dispersed, for example being implemented at a business having a plurality of employees. One portal communication device is used to access the database and/or a local call-routing switch. In a further aspect, the portal communications device prompts callers from a user directory, and is adapted to elicit a destination user identifier determined from a pre-defined directory, and designate the destination user identifier prior to passing a call through to the call-routing switch.

In another example embodiment of the present invention, a user logs-in through a communication device to establish an association between a user identifier and a communication device identifier. For example, a user calls from a telephone to access the call-routing database and enters a user identifier, and optionally a password. Logging in to a user account is similar to a UNIX® login using a user identifier plus passcode. A user's profile is automatically downloaded to a PBX after login, and associated with the communication device used to contact the database. A user's profile includes information associated with a user identifier, such as the user's name, address, billing information, back-up call routing, voice mail communication device identifier, e-mail account address, greetings, caller ID display data and communication device ring pattern. In a further example embodiment, a plurality of users login from the same communication device resulting in a plurality of user identifiers being associated with a one communication device. The plurality of users share the communication device and an announcement and authentication process, as previously described, is used to differentiate between users for each call routed to the common communication device.

Logging-in optionally triggers other customized communication system features. A user is optionally notified of voice mail message quantity and status in the user's voice mail box, notified of calendar functions and communication device status. For example, after logging in a user receives an audio message, "You have 2 new messages, 3 saved messages, a meeting in 10 minutes, you are the only user associated with this communication device which is on 'do not disturb' mode."

Another aspect of the present invention is that the call-routing switch arrangement is further adapted to optionally route non-local calls for delivery to the destination communication device through a broadband data network portion of the communication network. Users are optionally able to select a long-distance carrier for routing non-local calls. Non-local calls are calls made which are outside a local PSTN, or otherwise involve a toll charge to complete the call. In a further aspect, because the method of call-routing is transparent to a calling party, a signal to the calling party is used to indicate that the re-routed call requires access to a long-distance carrier to reach the intended called party.

FIG. 1 illustrates one example embodiment of a communication routing system 100 of the present invention. A local PSTN 110 is coupled to a remote PSTN 120 through a long distance carrier 130. Furthermore, local PSTN 110 is coupled though a local gateway 142 to a broadband data network 140, the Internet for example. Remote PSTN 120 is coupled to broadband data network 140 via a remote gateway 144. A plurality of communication devices 112 are communicatively coupled to local PSTN 110. Additionally, communication device 114 having device identifier "A" is also coupled to PSTN 110. A plurality of communication devices 122 are communicatively coupled to remote PSTN 120. Communication device 124 having device identifier "B" is also coupled to PSTN 120. A first user 116, having user identifier "A" is associated with communication device identifier "A" 114 and a second user 126, having user identifier "B" is associated with communication device identifier "B" 124.

A plurality of PSTNs and the broadband data network, along with other coupled communication channels and devices form a communication network. The communication network of the present invention is optional as described in related U.S. patent application Ser. No. 09/966,713, entitled "Distributed Local Telephony Gateway," filed on Sep. 28, 2001; the systems and methods described therein are fully incorporated herein by reference.

Call-routing switch 150 is coupled to local PSTN 110 in a manner by which calls received through switch 150 may be routed back to PSTN 110. In a further example embodiment, a call-routing switch is coupled to a PSTN with sufficient capacity to permit processing a plurality of communication paths simultaneously. Switch 150 is further coupled to broadband data network 140 through a portal gateway 160, gateway 160 functioning as a bridge between data network and non-data network portions of the communications network.

Portal gateway is implemented within a computer server platform 170 in the example embodiment of the present invention shown in FIG. 1. Other gateway implementations of a gateway functional block are contemplated within the scope of the present invention, a stand-alone interface for example. Server 170 is further communicatively coupled to local PSTN 110 through a portal communication device 172, a telephone interface device for example. Additionally, server 170 includes a user-programmable relational database 180 storing user information and association information, between user identifiers and device identifiers, between user information and user identifiers, between user identifiers and voice mail identifiers, and between user identifiers and e-mail addresses for example. Billing, operational, digital voice mail messaging, e-mail and other information are also optionally stored in database 180. Database 180 is alternatively implemented in a distributed manner, through a plurality of interconnected separate and geographically dispersed databases. Database information is parsed by information type and/or by geographic location of users as a particular application of the present invention requires.

Database 180 is communicatively coupled to call-routing switch 150. Call-specific, as well as associative information used to appropriately direct calls as described herein, are provided between switch 150 and database 180. Users have access to user-programmable features of database 180 through a PSTN network via portal communication device 172, or through the broadband data network 140 via portal gateway 160.

User "A" places a call to User "B" by entering User "B's" user identifier through communication device "A." Optionally, User "B's" user identifier includes a prefix portion that routes the call through the local PSTN to switch 150. Switch 150 re-directs User "A's" call to User "B" responsive to association data in database 180, User "B" being presently associated with communication device "B" 124. Communication device "B" is coupled to a remote PSTN, and is thus a non-local call. Switch 150 routes the call through portal gateway 160, broadband data network 140, remote gateway 144, remote PSTN 120 to communication device 124. User "B" receives the call through communication device 124.

Accordingly, the present invention is not to be necessarily limited to the particular examples described above, but is intended to cover all aspects of the invention as fairly set out in the attached claims. For instance, while telephony systems are illustrated, other communication systems can benefit from the above mentioned teachings. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A communication routing system for routing communications between different network paths for a plurality of user subscribers, the system comprising:
   an assignment circuit configured to
      for each of a plurality of communications-enabled devices, each including communications circuitry, assign a respective device identifier;
      receive user identifiers from the user subscribers, and
      for each of the user subscribers and in response to respective user identifiers received on behalf of the user subscribers, assign at least one of the user identifiers with a device identifier associated with a communications-enabled device operated by the user subscriber, and reassign or further associate the at least one user identifier to a different communications-enabled device in response to at least one of several user conditions establishing an association between the user identifier and the different communications-enabled device; and
   a router circuit configured and arranged to, for each communication initiated from an origination device to the at least one of the user identifiers, route the communication from the origination device to the different communications-enabled device by mapping, in response to the communication, the at least one of the user identifiers, via the reassignment or further association, to the different communications-enabled device.

2. The system of claim 1, wherein the assignment circuit is configured to:
   store in a user-programmable relational database, user information and association information including the assignment of user identifiers and device identifiers;
   receive on behalf of each respective user subscriber, user information including the user identifier and at least one communications-enabled device at which the user would like to receive communications; and
   configure a user-programmable relational database based on the received user information.

3. The system of claim 1, wherein the assignment circuit is further configured to assign another of user identifiers with the device identifier.

4. The system of claim 1, wherein the at least one of several user conditions establishes an association between the user identifier and the different communications-enabled device and includes an indication of location-based characteristics detected for at least one of the user's communications-enabled devices.

5. The system of claim 1, wherein
   the router circuit is further configured to determine a location of a communications-enabled device for a particular one of the users based upon data received via the user's communications-enabled device.

6. The system of claim 1, wherein the router circuit is configured to route communications to a mobile communications-enabled device, based upon an association of the routed communications with the mobile communications-enabled device.

7. The system of claim 1, wherein
   the assignment circuit includes a programmable data storage circuit that stores data indicative of the device identifiers assigned to the respective communications-enabled devices, and that stores data indicative of the user identifiers assigned to each device identifier, and
   the router circuit is respectively configured to associate the communications with a device identifier by accessing the data storage circuit and using the stored data indicative for use in associating the communications with a communications-enabled device.

8. The system of claim 1, wherein
   the assignment circuit includes a programmable data storage circuit that stores data indicative of the device identifiers assigned to the respective communications-enabled devices, and that stores data indicative of the user identifiers assigned to each device identifier,
   the programmable data storage circuit is responsive to the reassignment by storing data indicative of the reassignment of the user identifiers with new device identifiers, and
   the router circuit is respectively configured to associate the communications with a device identifier by accessing the data storage circuit and using the stored data indicative for use in associating the communications with a communications-enabled device.

9. The system of claim 1, wherein the user condition establishing the association between the user identifier and the different communications-enabled device includes the user logging into a user-programmable relational database with the user identifier from the other one of the user's communications-enabled devices.

10. The system of claim 1, wherein the router circuit is configured to
    associate the communications with a device identifier to which the user identifier in the communications is assigned by associating the communications with at least two device identifiers to which the user identifier in the communications is assigned,
    select both of the communications-enabled devices to which the at least two device identifiers are respectively assigned,
    concurrently route the communications to both of the communications-enabled devices, and
    in response to the routed communications being answered at one of the communications-enabled devices, connecting the communications to the one of the communications-enabled devices.

11. The system of claim 1, wherein the router circuit is configured to
    associate the communications with a device identifier to which the user identifier in the communication is assigned by associating the communication with at least two device identifiers to which the user identifier in the communication is assigned,
    select two of the communications-enabled devices to which the at least two device identifiers are respectively assigned,
    route the communication to a first one of the two communications-enabled devices, and
    in response to the routed communication not being answered at the first one of the two communications-enabled devices, route the communication to the other one of the two communications-enabled devices.

12. The system of claim 1, wherein the router circuit is configured to route received communications including either of at least two user identifiers associated with a device identifier to the communications-enabled device to which the device identifier is assigned.

13. The system of claim 1,
    further including a local network circuit configured to route received communications to a plurality of communications-enabled devices communicatively coupled to the network paths via the local network circuit, wherein the router circuit is configured to route the communication from the origination device to the selected communications-enabled device over the network paths and via the local network circuit, in response to the selected communications-enabled device being one of the plurality of communications-enabled devices coupled to the network paths via the local network circuit.

14. The system of claim 1, wherein the user identifiers are associated with a user profile that includes at least two of: a user name, address, billing information, back-up call routing, voicemail communication device identifier, e-mail account address, greetings, caller ID display data, and a communication device ring pattern.

15. The system of claim 1, wherein the assignment circuit is further configured and arranged to associate a plurality of user identifiers with one communications-enabled device, in response to a plurality of users logging in from the one communications-enabled device.

16. The system of claim 1, wherein at least two user identifiers includes a personal user identifier and a business user identifier of the user subscriber that operates the communications-enabled device having the device identifier assigned to the at least two user identifiers.

17. The system of claim 1, wherein the router circuit is configured to, for a communications including one of at least two user identifiers, authenticate a user answering the communications with a password prior to completing routing of the communications.

18. A method for routing communications between different network paths for a plurality of user subscribers, the method comprising:

in an assignment circuit,
for each of a plurality of communications-enabled devices, each including communications circuitry, assigning a respective device identifier;
receiving user identifiers from the user subscribers; and
for each of the user subscribers and in response to respective user identifiers received from the user subscribers, assigning at least two user identifiers with a device identifier for a communications-enabled device operated by the user subscriber, and reassigning a user identifier assigned to a device identifier for a communications-enabled device to a different communications-enabled device in response to one of several user conditions establishing an association between the user identifier and the different communications-enabled device; and in a router circuit, for each communication received from an origination device and including a first one of the at least two user identifiers, and for each communication initiated from the origination device and including the other one of the at least two user identifiers
associating the communication with a device identifier to which the user identifier in the communication is assigned by the assignment circuit,
selecting the one of the communications-enabled devices to which the device identifier associated with the communication is assigned by the assignment circuit, and
routing the communication from the origination device to the selected communications-enabled device using one of the network paths that is different than a network path via which the communication is received, wherein one or more of the user identifiers corresponds to web-based addresses.

19. The method of claim 18, wherein the user condition establishing the association between the user identifier and the different communications-enabled device includes detecting location-based characteristics of at least one of the user's respective communications-enabled devices.

20. The method of claim 18, wherein the step of assigning the at least two user identifiers with the device identifier for the communications-enabled device operated by the user includes logging in by the user through the communications-enabled device to establish an association between the user identifiers and the device identifier.

* * * * *